(12) United States Patent
Wang

(10) Patent No.: US 7,422,462 B2
(45) Date of Patent: Sep. 9, 2008

(54) CONNECTOR

(75) Inventor: Hsu-Fen Wang, Hsin-Tien (TW)

(73) Assignee: Advanced Connectek Inc. (TW)

( * ) Notice: Subject to any disclaimer, the term of this patent is extended or adjusted under 35 U.S.C. 154(b) by 0 days.

(21) Appl. No.: 11/825,949

(22) Filed: Jul. 10, 2007

(65) Prior Publication Data
US 2008/0014791 A1   Jan. 17, 2008

(30) Foreign Application Priority Data
Jul. 14, 2006 (TW) .............................. 95212405 U

(51) Int. Cl.
*H01R 13/62* (2006.01)
(52) U.S. Cl. ..................................................... 439/326
(58) Field of Classification Search ................ 439/326, 439/325, 331, 630
See application file for complete search history.

(56) References Cited
U.S. PATENT DOCUMENTS
5,603,629 A * 2/1997 DeFrasne et al. ............ 439/331
6,174,188 B1 * 1/2001 Martucci ..................... 439/326
2006/0068627 A1 * 3/2006 Matsunaga .................. 439/331

* cited by examiner

*Primary Examiner*—Phuong K Dinh
(74) *Attorney, Agent, or Firm*—Jackson Walker, LLP

(57) ABSTRACT

A connector holds and is connected electrically with a memory card such as a subscriber identity module (SIM) card and has an insulative housing, a plurality of terminals and a cover. The insulative housing has two sidewalls and a pair of holders. The holders are formed respectively on the sidewalls, and each holder has a lateral segment and a limiting segment. The lateral segment is formed on a corresponding sidewall. The limiting segment protrudes from the lateral segment to define a gap between the limiting segment and the corresponding sidewall. The terminals are mounted in the insulative housing. The cover is connected pivotally with the insulative housing and has a pair of mounting legs. Each mounting leg is connected with a corresponding sidewall and has a limiting tab selectively extending into a corresponding gap to prevent the mounting leg from moving transversely to further prevent the cover from detaching.

7 Claims, 6 Drawing Sheets

CONNECTOR

BACKGROUND OF THE INVENTION

1. Field of the Invention

The present invention relates to a connector, and more particularly to a subscriber identity module (SIM) card connector having an insulative housing, a cover and a pair of holders to prevent the cover from separating inadvertently from the insulative housing and keeping the SIM card in place.

2. Description of Related Art

With reference to FIG. 1, a conventional subscriber identity module (SIM) connector has an insulative housing (1) and a cover (2).

The insulative housing (1) connects a SIM card (3) to an electronic device and has a front end, a rear end, multiple slots, two opposite sides, a pair of pivot holes (12), two pairs of mounting notches (13) and a plurality of contacts (11). The slots are formed longitudinally in the insulative housing (1) between the front end and the rear end. The pivot holes (12) are defined respectively in the sides at the rear end. The mounting notches (13) are defined respectively in the sides between the pivot holes (12) and the front end. The contacts (11) are mounted respectively in the slots.

The cover (2) connects pivotally to the rear end of the insulative housing (1) and has a proximal end, a distal end, two opposite sides (21) and a pair of pivot tabs (22). Each side (21) of the cover (2) has two retaining tracks (211). The retaining tracks (211) are L-shaped, are formed on the side (21), hold a SIM card (3) slidably in the cover (2) and are respectively engaged with the mounting notches (13) to prevent the cover (2) from inadvertently pivoting. The pivot tabs (22) are formed respectively on and protrude longitudinally from the sides (21) at the proximal end and connect respectively to the sides at the rear end of the insulative housing (1). Each pivot tab (22) has a pivot boss (221). The pivot bosses (221) protrude inward and are mounted respectively in the pivot holes (12) in the insulative housing (1).

However, the pivot bosses (221) easily disconnect from the pivot holes (12) in the insulative housing (1) when an external force is applied inappropriately to open the cover (2).

To overcome the shortcomings, the present invention provides a connector to mitigate or obviate the aforementioned problems.

SUMMARY OF THE INVENTION

The main objective of the invention is to provide a connector having an insulative housing, a cover and a pair of holders to prevent the cover from separating inadvertently from the insulative housing to keep a card such as a subscriber identity module (SIM) card in place.

A connector in accordance with the present invention is connected selectively with a subscriber identity module (SIM) card to an electronic device and has an insulative housing, a plurality of terminals and a cover. The insulative housing has two sidewalls, a recess and a pair of holders. The holders are formed respectively on the sidewalls, and each holder has a lateral segment and a limiting segment. The lateral segment is formed on a corresponding sidewall. The limiting segment protrudes from the lateral segment to define a gap between the limiting segment and the corresponding sidewall. The terminals are mounted in the insulative housing. The cover is connected pivotally with the insulative housing and has a pair of mounting legs. Each mounting leg is connected with a corresponding sidewall and has a limiting tab selectively extending into a corresponding gap to prevent the mounting leg from moving transversely relative to the insulative housing to prevent the cover from detaching from the insulative housing.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
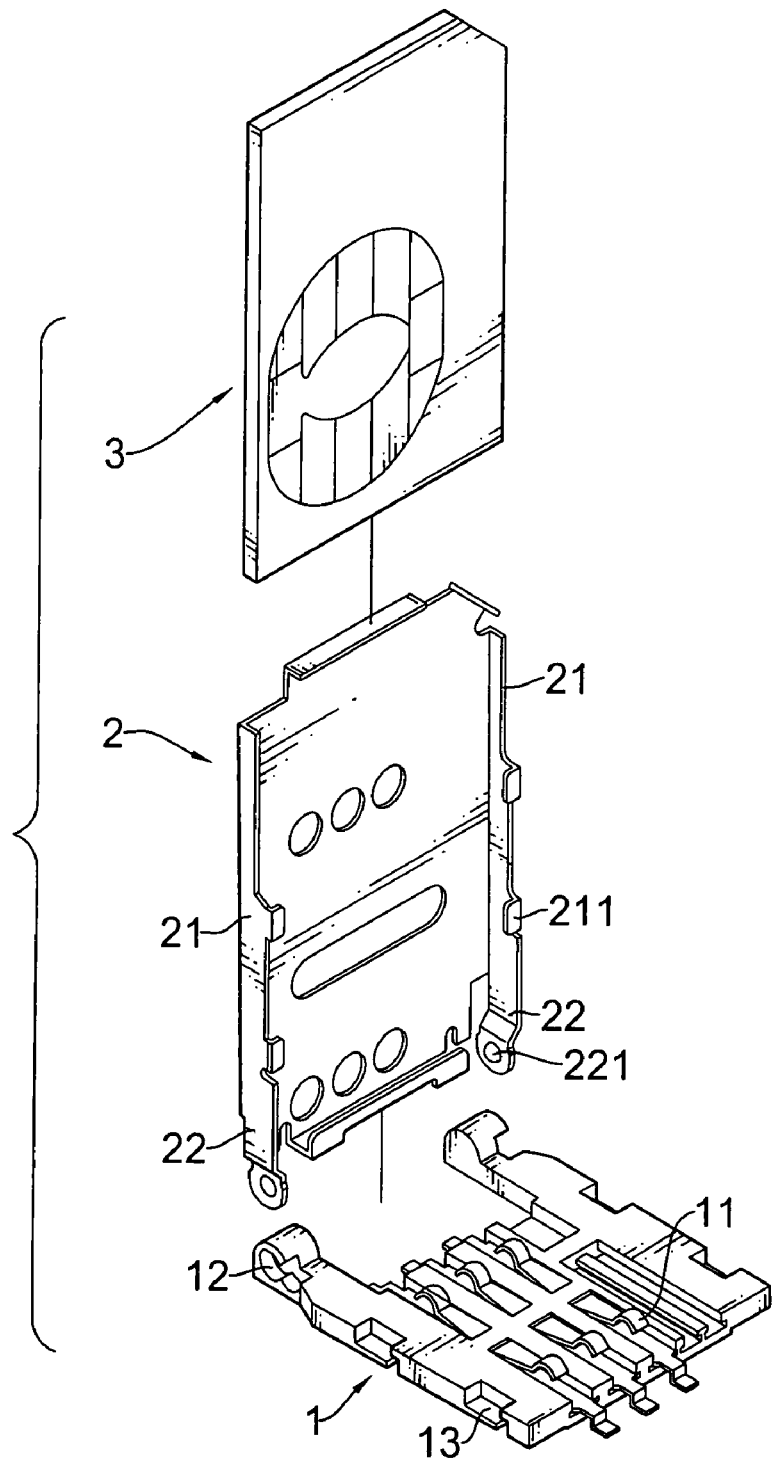
FIG. 1 is an exploded perspective view of a conventional SIM card connector in accordance with the prior art.
Figure 2:
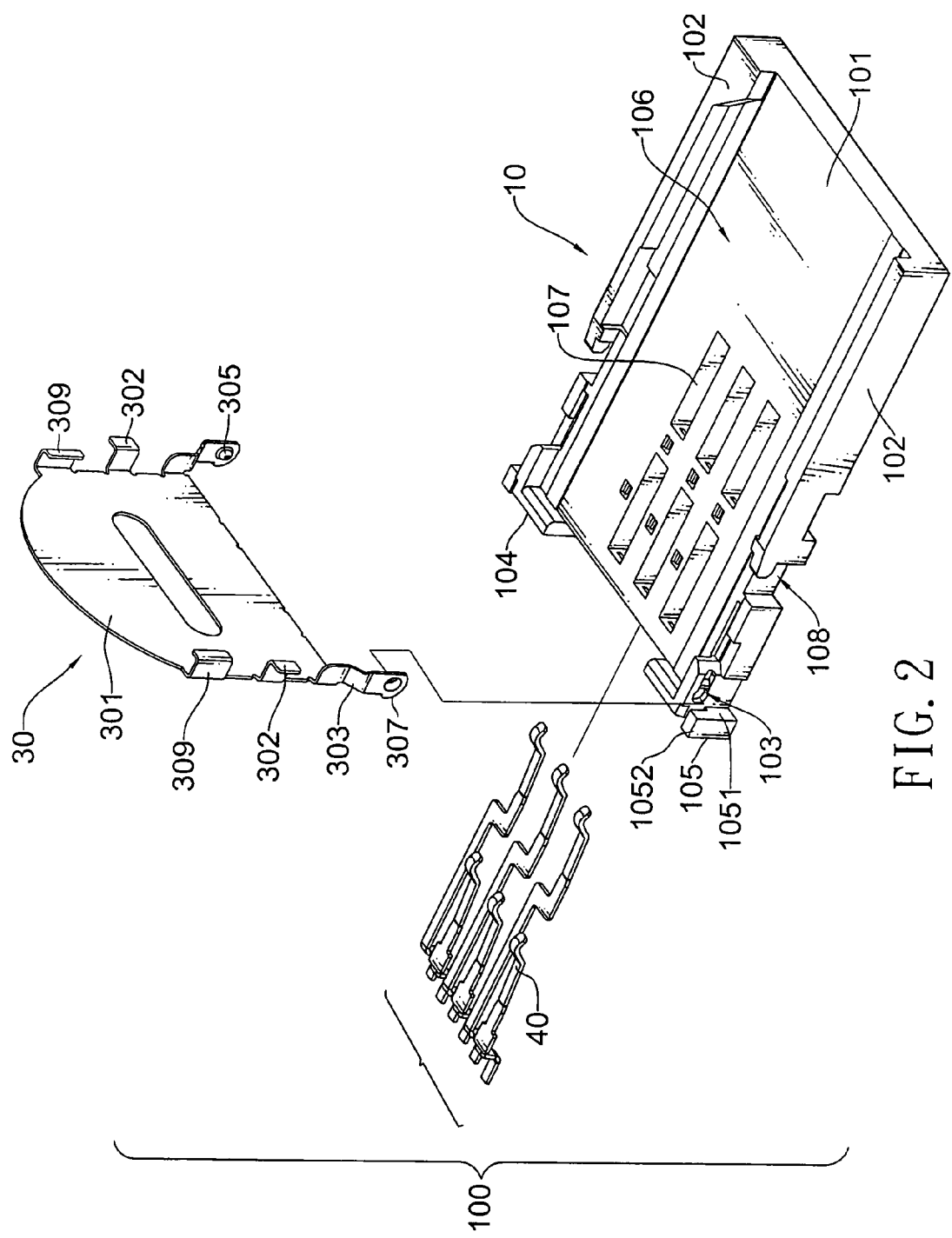
FIG. 2 is an exploded perspective view of a connector in accordance with the present invention.
Figure 3:
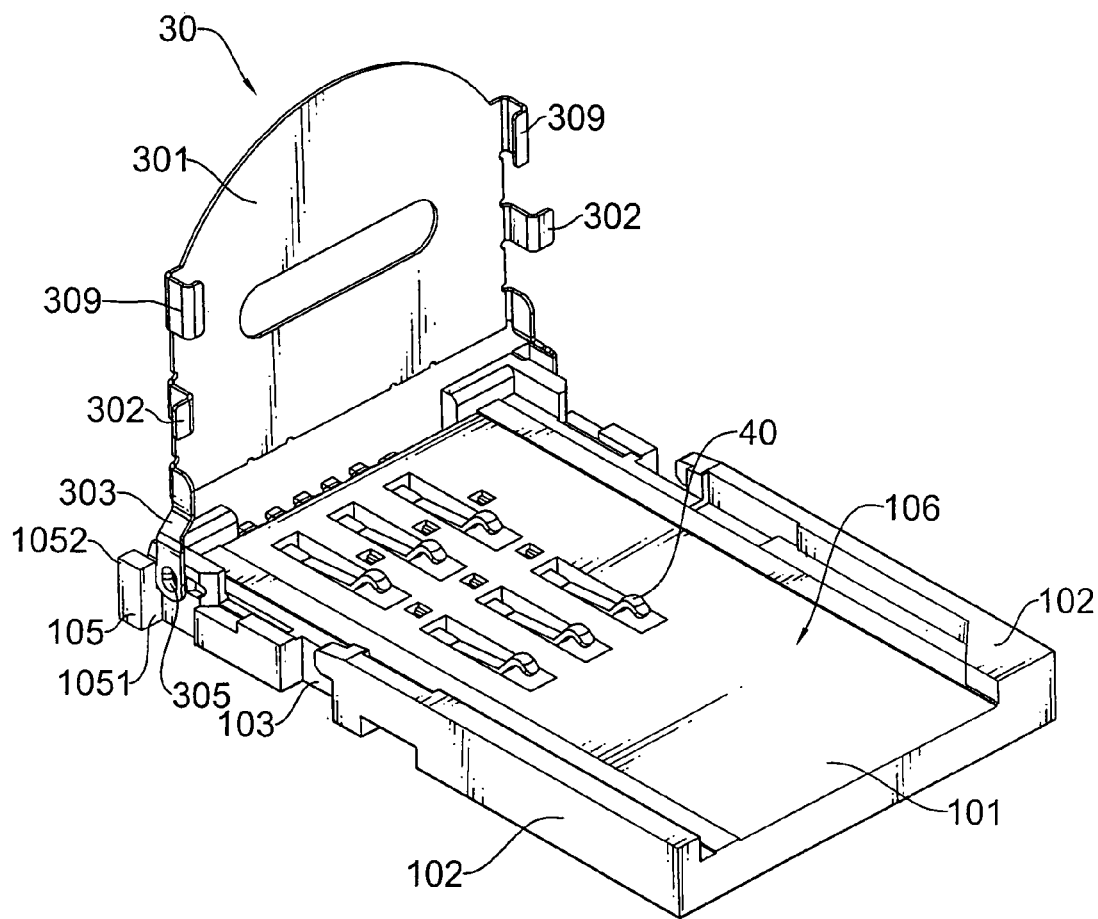
FIG. 3 is a perspective view of the connector in FIG. 2.
Figure 4:
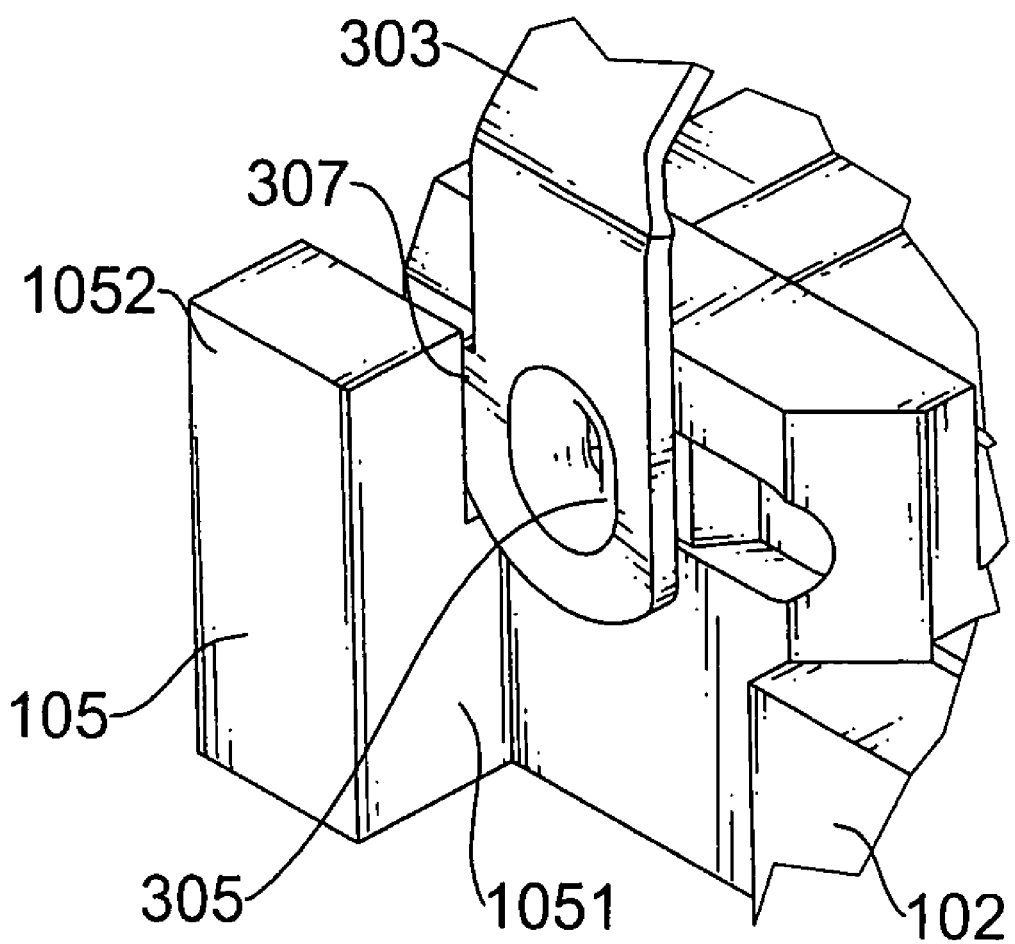
FIG. 4 is an enlarged perspective view of the connector in FIG. 2.
Figure 5:
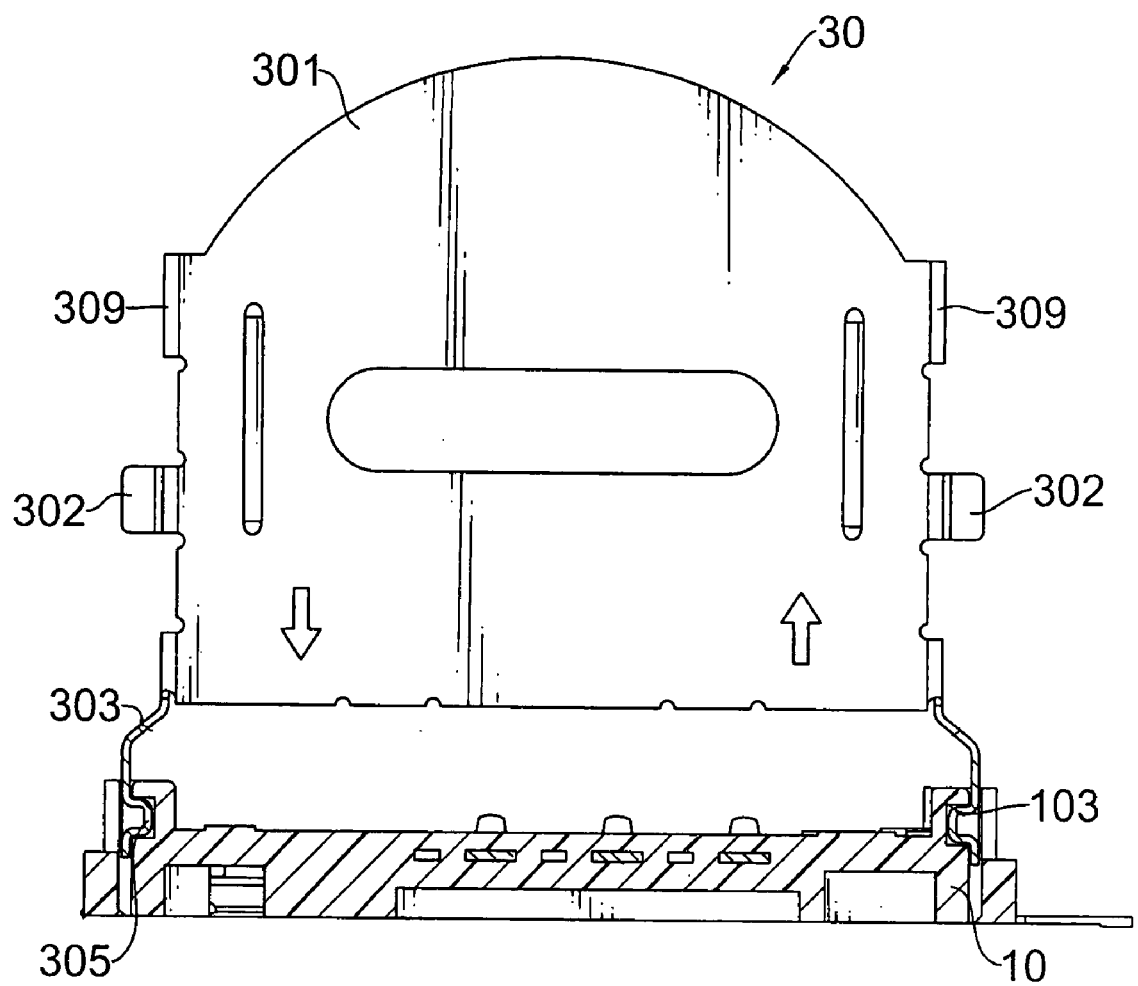
FIG. 5 is a rear view in partial section of the connector in FIG. 2.
Figure 6:
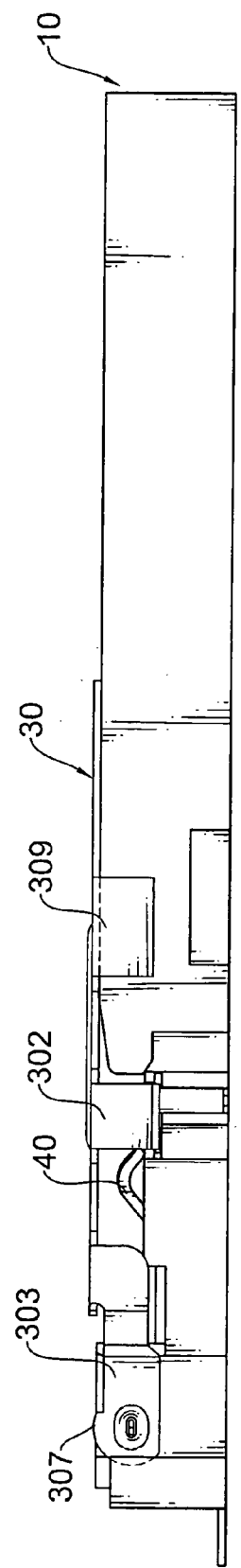
FIG. 6 is an operational side view of the connector in FIG. 2 with the cover closed.

With reference to FIGS. 2 and 3, a connector (100) in accordance with the present invention holds and is connected electrically with a memory card such as a subscriber identity module (SIM) card and comprises an insulative housing (10), a plurality of terminals (40) and a cover (30).

The insulative housing (10) has a front end, a rear end, a bottom (101), two opposite sidewalls (102), two rear walls (104), a recess (106), a pair of pivot holes (103), a plurality of mounting slots (107) and a pair of holders (105) and may further have a pair of mounting notches (108).

The sidewalls (102) are formed on and protrude up from the bottom (101).

The rear walls (104) are formed on and protrude up from the bottom (101) at the rear end adjacent respectively to the sidewalls (102).

The recess (106) is defined in the insulative housing (10) and may accommodate a SIM card.

The pivot holes (103) are defined respectively in the sidewalls (102) near the rear end.

The mounting slots (107) are defined in the bottom (101).

The holders (105) are L-shaped, correspond respectively to and are formed respectively on the sidewalls (102) adjacent to the rear end, and each holder (105) has a lateral segment (1051) and a limiting segment (1052). The lateral segment (1051) is formed on and protrudes transversely out from a corresponding sidewall (102). The limiting segment (1052) is connected with and protrudes perpendicularly from the lateral segment (1051) and is separated from the corresponding sidewall (102) to define a gap between the limiting segment (1052) and the corresponding sidewall (102).

The mounting notches (108) are defined respectively in the sidewalls (102), and each mounting notch (108) has an inner surface.

The terminals (40) are conductive and are mounted respectively in the mounting slots (107).

The cover (30) is connected pivotally with the insulative housing (10) at the rear end and has a body (301), two opposite sides and two mounting legs (303) and may further have a pair of retaining tracks (309) and a pair of clamps (302).

The body (301) has a proximal end and a distal end.

The mounting legs (303) are formed respectively on and protrude respectively out from the sides at the proximal end of the body (301). The mounting legs (303) correspond respectively to the sidewalls (102) and the holders (105) and are pivotally connected respectively with the sidewalls (102) of the insulative housing (10) at the rear end. Each mounting leg (303) has an outer edge, a pivot boss (305) and a limiting tab (307). The pivot boss (305) is formed transversely on the mounting leg (303) by punching the mounting leg (303) and is mounted in the pivot hole (103) in a corresponding sidewall (102) of the insulative housing (10). The limiting tab (307) may be curved, is formed on and protrudes out from the outer edge of the mounting leg (303) and selectively extends into the gap between the limiting segment (1052) of a corresponding holder (105) and the corresponding sidewall (102) to abut the limiting segment (1052). When the cover (30) opens on the insulative housing (10), the limiting tab (307) extends into the gap and abuts the limiting segment (1052). The limiting segment (1052) presses against the limiting tab (307) and keeps the mounting leg (303) from bending and moving transversely relative to the insulative housing (10) to further prevent the pivot boss (305) from escaping from the pivot hole (103). With the limiting holders (105) and the limiting tabs (307), the cover (30) will not separate inadvertently from the insulative housing (10).

The retaining tracks (309) are formed respectively on and protrude respectively from the sides of the cover (30) and may slidably hold a SIM card.

The clamps (302) are formed respectively on and protrude respectively out from the sides of the cover (30) and are selectively engaged with the mounting notches (108) in the insulative housing (10) tightly to clamp the insulative housing (10) and prevent the cover (30) from opening inadvertently.

The holders (105) and the limiting tabs (307) prevent the pivot bosses (305) on the mounting legs (303) of the cover (30) from escaping from the pivot holes (103) in the insulative housing (10). Therefore, the cover (30) firmly is connected with the insulative housing (10) and will not detach unintentionally.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A connector adapted to hold and be connected electrically with a card, the connector comprising:
    an insulative housing having
        a front end;
        a rear end;
        a bottom;
        two opposite sidewalls being formed on and protruding up from the bottom;
        two rear walls being formed on and protruding up from the bottom at the rear end adjacent respectively to the sidewalls;
        a recess being defined in the insulative housing;
        a pair of pivot holes, the pivot holes being defined respectively in the sidewall near the rear end;
        a plurality of mounting slots being defined in the bottom; and
        a pair of holders, the holders being L-shaped, corresponding respectively to and formed respectively on the sidewalls adjacent to the rear end, and each holder having
            a lateral segment being formed on and protruding transversely out from a corresponding sidewall; and
            a limiting segment connected with and protruding perpendicularly from the lateral segment and being separated from the corresponding sidewall to define a gap between the limiting segment and the corresponding sidewall;
    a plurality of terminals, the terminals being conductive and being mounted respectively in the mounting slots; and
    a cover connected pivotally with the insulative housing at the rear end and having
        a body having a proximal end and a distal end;
        two opposite sides; and
        two mounting legs being formed respectively on and protruding respectively out from the sides at the proximal end of the body, corresponding respectively to the sidewalls and the holders and pivotally connected respectively with the sidewalls of the insulative housing at the rear end, and each mounting leg having
            an outer edge;
            a pivot boss being formed transversely on the mounting leg and being mounted in the pivot hole in a corresponding sidewall of the insulative housing; and
            a limiting tab being formed on and protruding out from the outer edge of the mounting leg and selectively extending into the gap between the limiting segment of a corresponding holder and the corresponding sidewall to abut the limiting segment.

2. The connector as claimed in claim 1, wherein the connector is a subscriber identity module (SIM) connector.

3. The connector as claimed in claim 1, wherein the limiting tab is curved.

4. The connector as claimed in claim 1, wherein the cover further has a pair of retaining tracks, and the retaining tracks are formed respectively on and protrude respectively from the sides of the cover and slidably hold a subscriber identity module (SIM) card.

5. The connector as claimed in claim 3, wherein the cover further has a pair of retaining tracks, and the retaining tracks are formed respectively on and protrude respectively from the sides of the cover and slidably hold a subscriber identity module (SIM) card.

6. The connector as claimed in claim 1, wherein:
    the insulative housing further has a pair of mounting notches, the mounting notches are defined respectively in the sidewall of the insulative housing, and each mounting notch has an inner surface; and
    the cover further has a pair of clamps, the clamps are formed respectively on and protrude respectively out from the sides of the cover and are selectively engaged respectively with the mounting notches in the insulative housing tightly to clamp the insulative housing.

7. The connector as claimed in claim 5, wherein:
    the insulative housing further has a pair of mounting notches, the mounting notches are defined respectively in the sidewall of the insulative housing, and each mounting notch has an inner surface; and
    the cover further has a pair of clamps, the clamps are formed respectively on and protrude respectively out from the sides of the cover and are selectively engaged respectively with the mounting notches in the insulative housing tightly to clamp the insulative housing.

* * * * *